US009297497B1

(12) United States Patent
Vainshtein et al.

(10) Patent No.: US 9,297,497 B1
(45) Date of Patent: Mar. 29, 2016

(54) UNIVERSAL TABLET CRADLE

(71) Applicants: Leonid Vainshtein, Phoenix, AZ (US);
Jason Swanson, Tempe, AZ (US)

(72) Inventors: Leonid Vainshtein, Phoenix, AZ (US);
Jason Swanson, Tempe, AZ (US)

( * ) Notice: Subject to any disclaimer, the term of this patent is extended or adjusted under 35 U.S.C. 154(b) by 10 days.

(21) Appl. No.: 14/445,900

(22) Filed: Jul. 29, 2014

Related U.S. Application Data

(60) Provisional application No. 61/859,672, filed on Jul. 29, 2013.

(51) Int. Cl.
*A47B 97/04* (2006.01)
*F16M 13/02* (2006.01)
*G06F 1/16* (2006.01)

(52) U.S. Cl.
CPC .............. *F16M 13/02* (2013.01); *G06F 1/1613* (2013.01)

(58) Field of Classification Search
CPC ............................... F16M 13/02; G06F 1/1613

USPC ............... 248/445, 447, 447.1, 918, 920, 923
See application file for complete search history.

(56) References Cited

U.S. PATENT DOCUMENTS

| | | | | | |
|---|---|---|---|---|---|
| 1,401,458 | A | * | 12/1921 | Boon | 248/456 |
| 2,975,544 | A | * | 3/1961 | Lutterberg | 248/451 |
| 4,184,725 | A | * | 1/1980 | Spangler | 312/233 |
| 4,460,145 | A | * | 7/1984 | Ando | 248/447 |
| 5,082,229 | A | * | 1/1992 | Dahl | 248/444.1 |
| 5,120,014 | A | * | 6/1992 | Chou | 248/451 |
| 5,646,819 | A | * | 7/1997 | Hill, III | 361/679.6 |
| 8,302,929 | B2 | * | 11/2012 | Lanio | 248/683 |

* cited by examiner

*Primary Examiner* — Gwendolyn Baxter

(57) ABSTRACT

A universal tablet cradle assembly for supporting and storing a tablet or electronic device. The universal tablet cradle mounts under a cabinet or shelf and allows for storage and hands-free viewing of any size tablet. The universal tablet cradle also allows for adjustment of the viewing position of the tablet within the cradle, allowing the tablet to be moved forward and backward, and rotated. The viewing angle of the tablet also is adjustable.

16 Claims, 5 Drawing Sheets

UNIVERSAL TABLET CRADLE

CROSS-REFERENCE TO RELATED APPLICATION

This application claims the benefit of U.S. Provisional Patent Application No. 61/859,672 filed Jul. 29, 2013, the contents of which are hereby incorporated by reference.

TECHNICAL FIELD

This description relates generally to a an assembly or fixture for supporting and storing an item, and more specifically relates to a fixture or assembly for supporting and storing a tablet computer or equivalent personal electronics device, under a cabinet or similar item of furniture.

BACKGROUND

Many people have electronic tablet devices from multiple manufacturers that they use in their places of residence or buildings. There are typically limited options for people to store or hold their tablet devices under cabinets or shelves, such as those found in the kitchen or any other room of a building. Stands may typically be included in covers or cases for such devices. However such stands typically have limited ranges of adjustment, and typically require a somewhat flat surface upon which to set them.

Also, there are limited cradles available that have universal fit for multiple devices of differing sizes and from different manufacturers. A tablet cradle that allows for its use without requiring a unique case or attachment method for each specific tablet device is advantageous.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides for a tablet cradle that mounts under a cabinet, shelf, or other substantially flat surface and allows for storage and hands-free viewing of any size tablet, or equivalent consumer electronics device. The universal tablet cradle allows for adjustment of the viewing position of the tablet held by the cradle, allowing the tablet to be moved forward and backward, and rotated. The viewing angle, or tilt, of the tablet is also adjustable.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a universal tablet cradle for hands-free use of almost any tablet or similar electronic device. Although the present examples are described and illustrated herein as being implemented with a tablet device, the system described is provided as an example and not a limitation. As those skilled in the art will appreciate, the present examples are suitable for application in a variety of different types of hand-held electronic devices, such as cellular phones, tablets with keyboards, smart phones, e-readers, and the like.

A tablet cradle that mounts under a cabinet, shelf or similar structure can be used for easy hands-free viewing and use of the tablet, as well as provide for storage of the cradle, or the tablet disposed in the cradle, in a concealed manner. It is also typically necessary for a user to be able to adjust the position of a tablet within the cradle forward, backwards, and rotationally, as well as adjust the viewing angle easily.

Figure 1:
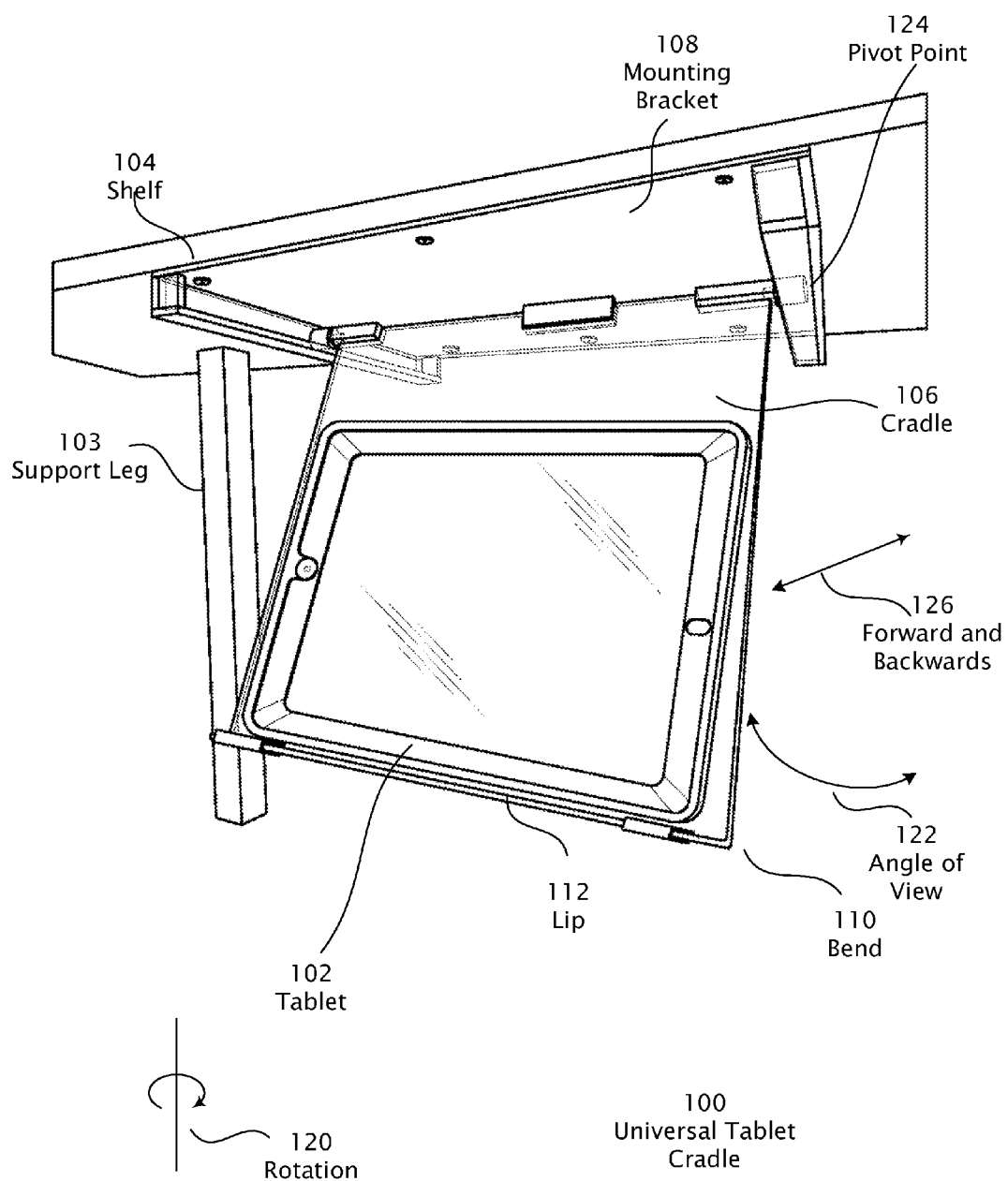
FIG. 1 is a pictorial view of the universal tablet cradle in the open position with a tablet device disposed in the cradle.

FIG. 1 is a pictorial view of the universal tablet cradle in the open position with a tablet device disposed on it for convenient viewing and use. The tablet position may be changes as convenient by rotation 120, angle of view 122 (about pivot axis 124). The tablet 102 may also be brought forward or backwards 126 for easier viewing. A universal tablet cradle 100 is shown mounted to the bottom of an exemplary shelf 104 supported by one or more legs, one of which is shown 103. Alternatively, the universal tablet cradle may be mounted to the underside of a cabinet or the like.

The universal tablet cradle is coupled to the shelf 104 through mounting bracket 108 with conventional fasteners or their equivalent, such that the cradle is mounted underneath the substantially flat shelf surface 104.

The tablet 102 may rest in the cradle 106. There is typically enough clearance to allow for a tablet having an installed case to rest in the cradle. The cradle 106 is a substantially flat piece of material with a 45 to 90 degree bend 110 near a first edge. The bend 110 in the cradle 106 provides a lip 112 upon which the tablet rests, and otherwise keeps it in place in the cradle. At a second edge substantially parallel to the first edge the cradle may be pivotally coupled to the mounting bracket 108.

Through the coupling mechanism of the cradle 106 to the mounting bracket 108 the cradle 106 can be positioned to provide the user with an optimal view of the tablet 102, as well as to operate the touch screen if the tablet is so provided. The cradle with the tablet can be positioned at any angle 122 relative the bottom of the shelf or cabinet to which it is mounted, be positioned forward or backwards 126, as well as rotate 120 to suit the needs of any multitude of users and environmental conditions.

Figure 2:
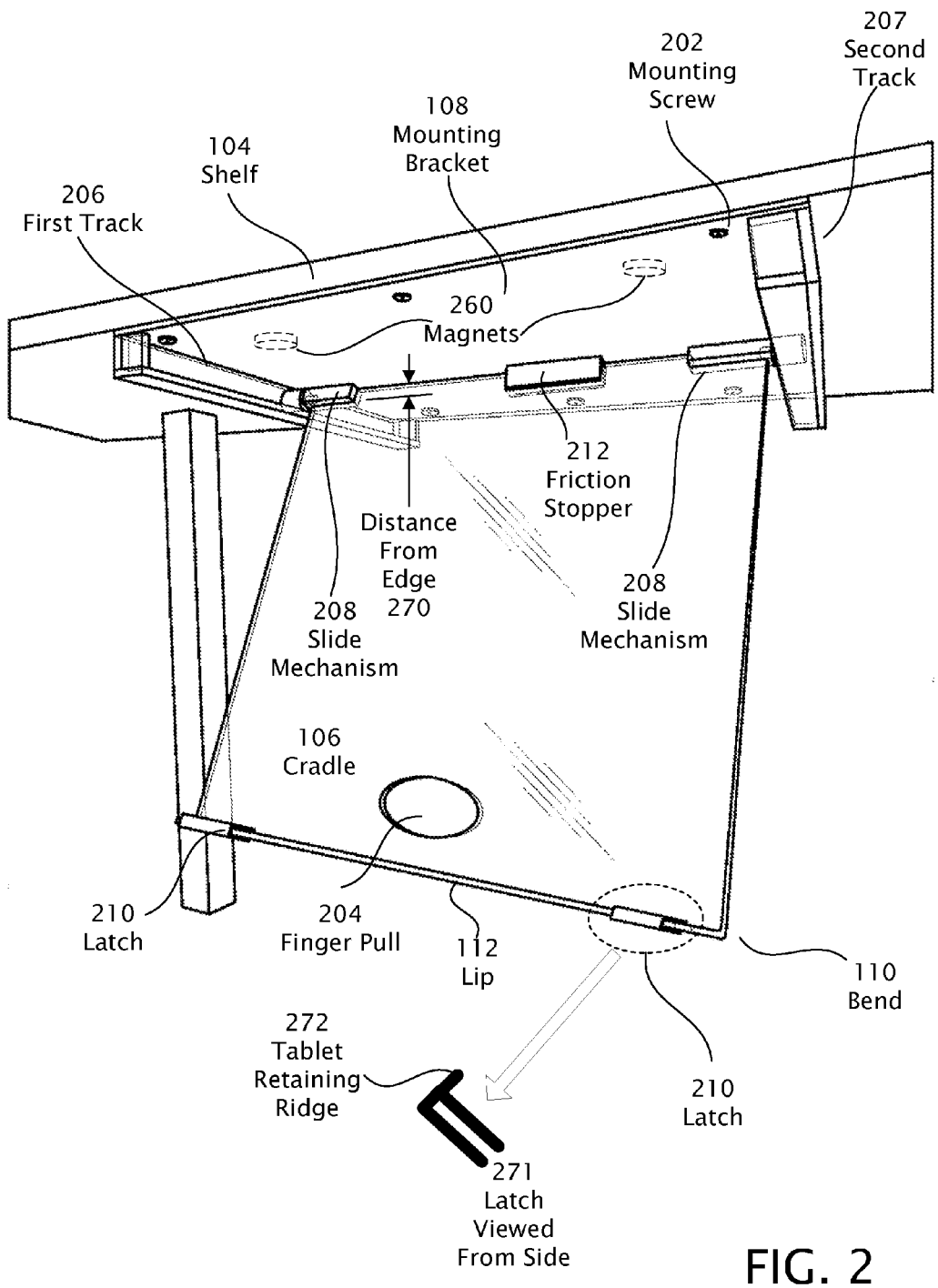
FIG. 2 is a pictorial view of the universal tablet cradle in the open position without a tablet device in place.

FIG. 2 is a universal tablet cradle 100 in the open position without a tablet device. The universal tablet cradle may be coupled to the bottom of a shelf 104 or cabinet via the mounting bracket 108, utilizing conventional fastening techniques. The mounting bracket 108 may have holes that allow fixturing or mounting to the cabinet or shelf with mechanical fasteners including but not limited to screws 202, bolts, tapes, or adhesives. The mounting bracket may be constructed from injection molding, thermoforming, roto-molding, machined plastics, ferrous or non-ferrous metals, stamped steel parts, extrusions and raw plastics or ferrous or non-ferrous metals that are welded or adhered to one another.

A pair of similarly constructed tracks including a first track 206 and a second track 207 couple the cradle 106 to the mounting bracket 108. The mounting bracket is generally square or rectangular, with the mounting tracks mounted substantially parallel to each other and substantially along an edge of the mounting bracket. The tracks 206 and 207 are coupled to the mounting bracket 108 using conventional mechanical methods, such as bolts, screws, tapes, adhesives, or the like. The tracks 206 and 207 accept a slide mechanisms 208 coupled to the cradle 106. The slide mechanism generally in operation allows the cradle 106 to have linear, angular, and rotational motions while inside the track and remaining coupled to it. The tracks may be constructed from one or more pieces that may be made by stamped metal forming, extrusions with ferrous and non-ferrous metals, machined raw ferrous and non-ferrous or plastic stock, injection molding, thermoforming, roto-molding or raw stock that is plastic or ferrous or non-ferrous that is adhered or welded together.

In an alternative example a single center track may be provided. Such a track may allow the cradle to rotate (120 of FIG. 1), This allows greater flexibility in positioning the tablet.

The cradle 106 consists of a substantially square or rectangular substantially flat piece of material with a 45 to 90 degree bend 110 forming a lip at its first edge. This lip 112 also forms a shelf to allow a tablet to stay securely positioned on the cradle 106, through a typically magnetic latch, or latches 210. The cradle 106 may be provided with a finger pull 204. The finger pull 204 may be an aperture in the cradle 106 to allow a user to conveniently position the cradle 106. Alternatively a knob or other extension on the back of the cradle may be provided to allow the user to grip and reposition the cradle. The cradle can be constructed using several methods, such as from ferrous or non-ferrous metals, as well as plastics via injection molding, extrusion, thermoforming, or machining of raw plastic or ferrous or non-ferrous metal stock.

The construction and configuration of the cradle 106 allows tablets of different dimensions to be used with the universal tablet cradle. There is no need for a unique case or accessory to stand up or position the tablet.

Friction may advantageously be used to keep the cradle in place. On the top edge of the cradle 106 is a friction stopper 212 that may increase the friction between the top of the cradle 106 and the mounting bracket 108. This increase in friction between the top of the cradle and the mounting bracket aids in securing the tablet device from moving or bouncing when the cradle 106 is lowered to is viewing angle and the tablet is resting in the cradle 106. The friction stopper also tends to keep the cradle in place during times when keyboard entry is used to enter information on the tablet (not shown).

The angle between the cradle and the mounting bracket 108, when the cradle 106 is lowered may be determined by the distance from the edge 270 to the pivot point about which the slide mechanism rotates when the cradle is lowered. The greater the distance from the edge 270 is made, the less resulting angle for the cradle when deployed. The edge of the cradle with the friction stopper 212 contacts the mounting bracket 108 as the cradle 106 is lowered, and maintains the angle of the cradle relative to the mounting bracket. Exemplary distances 270 may include 0.2625 inches to 0.7375 inches, or the like.

Rollers or ball bearing slide mechanisms 208 may be coupled to the cradle 106 to allow linear, angular, and rotational movement inside the tracks 206 and 207. The slide mechanism also allows the cradle 106 to pivot to open and closed positions in the mounting bracket 108. The mechanism that can allow the linear/rotational motion can be ball bearing rollers, cam followers, ball bearing slides, or plain bearings. The slide mechanism 208 are coupled to the cradle via a mechanical fastener including, but not limited to, screws, bolts, rivets, pins, or shafts with mechanical retaining clips.

In alternative examples of the invention a mechanical pivoting device or hinge (not shown) may be attached to the rollers or ball bearing slide mechanisms 208 that typically allows the angle of the cradle 106 to be adjusted in reference to the mounting bracket 108. This hinge can incorporate a locking mechanism that may allow specific angle increments to be selected, or a hinge mechanism that allows infinite angle increments to be selected by the user. The hinge may be disposed on one or both sides of the cradle where the slide mechanisms 208 are present.

Mechanical or magnetic latches 210 are coupled to the shelf 104 at the bottom of the cradle 106, which hold the universal tablet cradle in the closed position when engaged with magnets 260 disposed in the mounting bracket 108. Typically the latch may be made of a ferromagnetic material and may fit over the lip to which it is attached by conventional methods. As the latch is viewed from the side 271, an additional tablet retaining ridge 272 may be provided on the latch 210 that tends to keep the tablet in place while in use.

Figure 3:
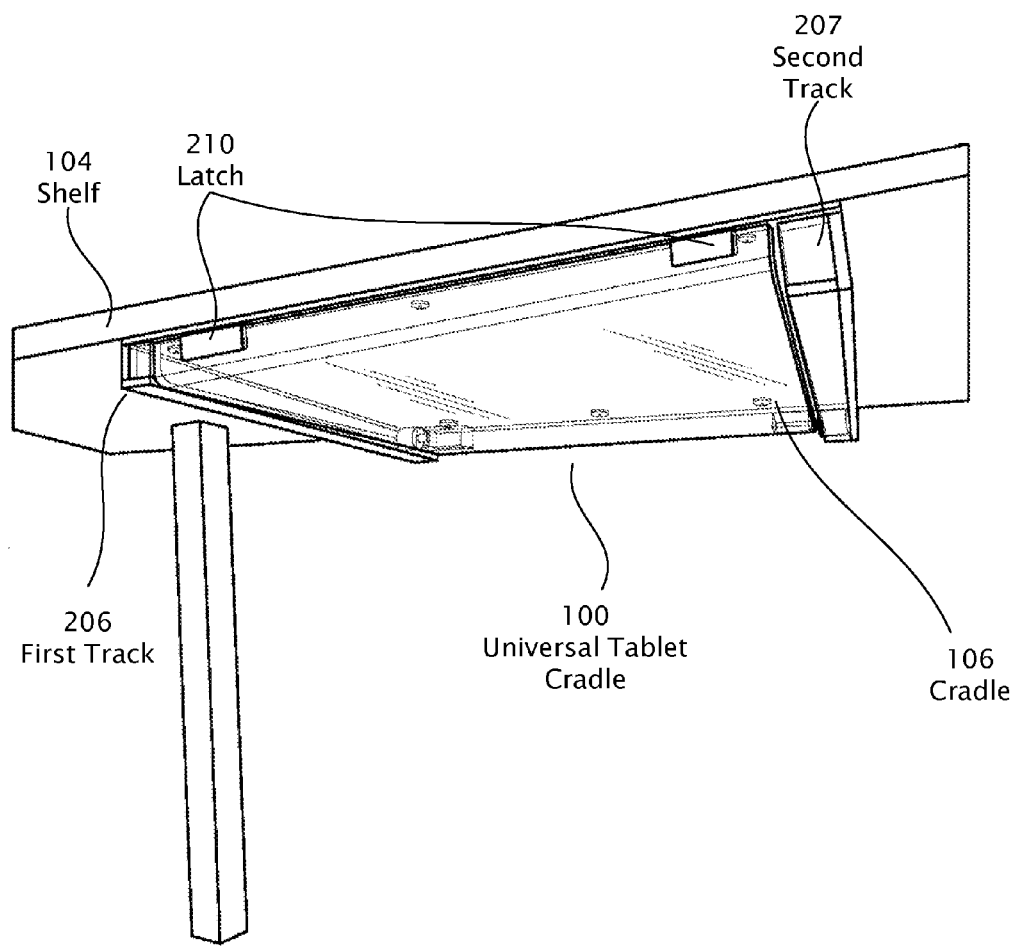
FIG. 3 is a pictorial view of the universal tablet cradle in the closed position.
Figure 4:
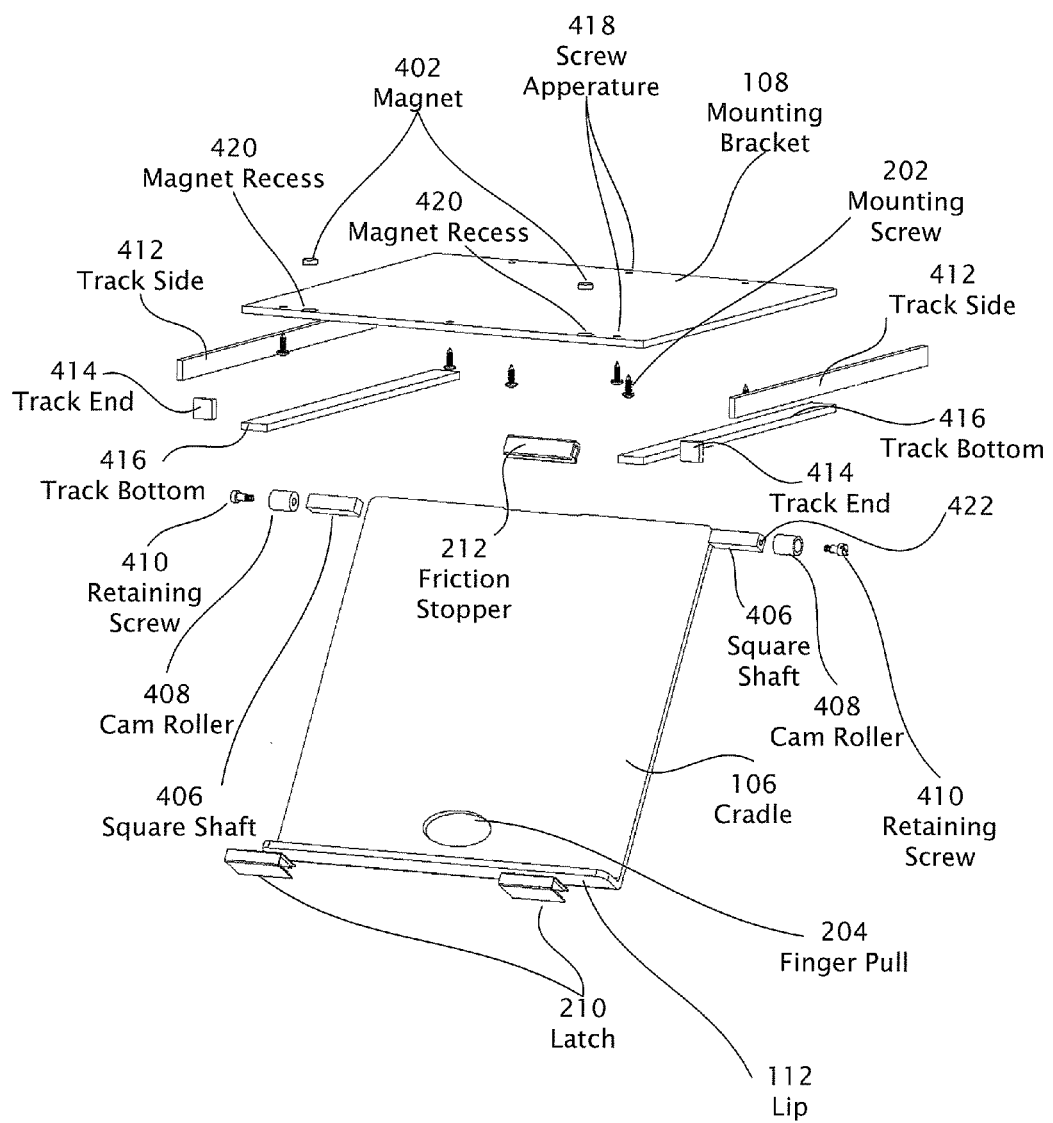
FIG. 4 is an exploded view showing the components of an example of a universal tablet cradle.

FIG. 3 is a universal tablet cradle 100 in the closed position. When the cradle 106 pivots between the open and closed position, a mechanical latch or magnetic closure 210 may hold the cradle 106 in the closed position against the mounting bracket 108. The universal tablet cradle can be closed to remove it from view either with the tablet in place for storage, or without the tablet in place FIG. 4 is an exploded view of the components of a universal tablet cradle. Those skilled in the art will recognize that while this diagram represents one way to construct a universal tablet cradle, there are many methods and materials that may be utilized.

The first and second tracks are constructed using a side piece 412, a bottom piece 416, and an end piece 414, which can be coupled by welding or adhering together to form the track. The track side 412 and the track bottom are substantially rectangularly elongated and may be coupled by welding or adhering together along one long edge of both the track side and track bottom. The track end may be substantially square and may be coupled to the coupled track side and track bottom at one end by welding or otherwise adhering together.

The mounting bracket 108 may be provided with a plurality of apertures 418 through which a plurality of mounting screws 202 may be placed to couple the mounting bracket 108 to the underside of a cabinet or the like. The mounting bracket may be provided with magnet recesses 420 into which the magnets 402 may be placed. The first and second tracks may be coupled to the mounting bracket 108 by welding or otherwise adhering the remaining long edge of the joined track pieces in a substantially parallel orientation at opposite edges of the mounting bracket.

The square shaft 406, the cam roller 408, and the retaining screw 410 are components of the slide mechanisms that attach to opposite sides of the cradle 106. The square shaft 406 may be attached to the top edge of the cradle at the sides of the cradle using mechanical fasteners such as screws, rivets, tape, adhesives, or the like. The square shaft may be provided with a threaded hole 422 into which the retaining screw 410 may be inserted to couple the cam roller 408 to the square shaft.

The friction stopper 212 may be coupled to the cradle 106 along the top edge of the cradle substantially in the center. The friction stopper may be retained on the cradle by friction between the friction stopper and cradle, or by mechanical means such as tape or adhesives or the like.

The latches 210 may be coupled to the cradle along the lip 112 in a location that will match the location of the magnets 402. The latches may be coupled to the cradle with a friction fit, or by mechanical means such as screws, rivets, tapes, or adhesives, or the like.

The cradle with latches, sliding mechanisms, and friction stopper may be coupled to the mounting bracket with tracks and magnets by inserting the sliding mechanisms into the tracks at the open end of the coupled mounting bracket and tracks.

Figure 5:
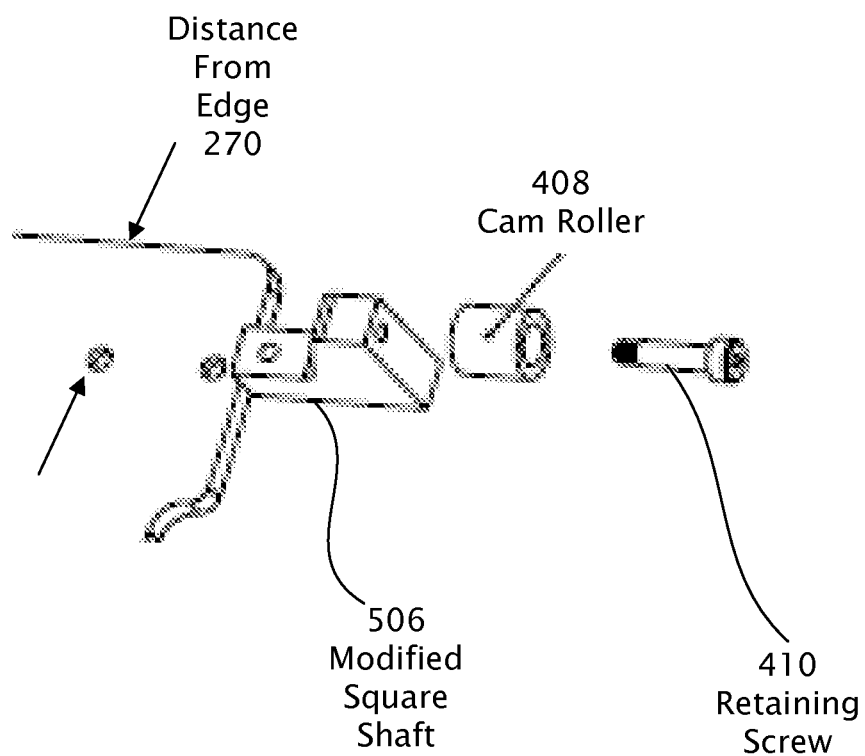
FIG. 5 shows a modified square shaft.

FIG. 5 shows a modified square shaft. Use of the modified square shaft 506 may allow thicker tablets, or tablets with cases to be stored in the cradle which accordingly have their other dimensions adjusted. The "L" shape causes the cradle (106 of FIG. 1) to be spaced farther from the mounting bracket (101 of FIG. 1). The extra clearance provide by this modified shaft may also allow a charger to be coupled to a tablet being stored. Especially with the grooves that may be cut out in the cradle. The width of the unthreaded portion of retaining screw 410 is wider than the width of cam roller 408 to enable the cam roller 408 to slide on screw 410 and allow the cradle 106 to rotate as shown at 120.

What has been described above includes several examples for illustration that are not intended to limit the ways that those of ordinary skill in the art can achieve the spirit and purpose of the universal tablet cradle. Those of ordinary skill in the art will recognize that further combination and permutations are possible. Accordingly, this application is intended to embrace alterations, modifications, and variations that fall within the scope of the description herein.

The invention claimed is:

1. A universal tablet cradle assembly for supporting and storing a computer tablet, the universal tablet cradle assembly comprising:
   a mounting bracket, wherein the mounting bracket is configured to be mounted under a horizontal surface;
   a cradle, with a top edge and a bottom edge, comprising:
      a lip at said bottom edge configured to retain the computer tablet;
      a pair of sliding mechanisms, one said sliding mechanism disposed at each side of said top edge; and
   a pair of tracks coupled to the mounting bracket and receiving said sliding mechanisms, wherein the cradle extends laterally between the pair of tracks and is configured to:
      move linearly along the tracks in a forward and rearward direction, and
      rotate downwardly between the pair of tracks to a secured displayed position while positioned in multiple locations along the tracks while supporting the computer tablet;
   wherein the cradle bottom edge is configured to rotate downwardly between the pair of tracks to the secured displayed position when the cradle is positioned in any location along the tracks while supporting the computer tablet.

2. The universal tablet cradle assembly of claim 1 wherein a pair of magnets are disposed within the mounting bracket and are configured to hold the cradle in a closed position.

3. The universal tablet cradle assembly of claim 1 wherein the cradle is provided with a finger pull aperture.

4. The universal tablet cradle assembly of claim 1 wherein the pair of sliding mechanisms are configured to laterally move within the respective tracks, in a direction transverse to the tracks, to allow axial rotation of the cradle between the pair of tracks.

5. The universal tablet cradle assembly of claim 4 wherein the sliding mechanisms comprise a roller disposed about a fastener, wherein the roller can move linearly along the fastener and inside the track to allow the cradle to axially rotate between the pair of tracks.

6. The universal tablet cradle assembly of claim 4 wherein the mounting bracket is configured to be fixedly mounted under the horizontal surface, such that there is no spacing between the mounting bracket and the horizontal surface.

7. The universal tablet cradle assembly of claim 1 wherein a pair of latches is disposed along said lip, the pair of latches configured to secure the cradle toward the mounting bracket while storing the computer tablet.

8. The universal tablet cradle assembly of claim 1 further comprising a friction stopper at the top edge of said cradle, the friction stopper configured to secure the cradle in the displayed position while supporting the computer tablet.

9. A universal tablet cradle assembly for supporting and storing a computer tablet, the universal tablet cradle assembly comprising:
   a mounting bracket, wherein the mounting bracket is configured to be mounted under a horizontal surface;
   a cradle, with a top edge and a bottom edge, comprising:
      a lip at said bottom edge configured to retain the computer tablet;
      a pair of sliding mechanisms, one said sliding mechanism disposed at each side of said top edge; and
   a pair of tracks coupled to the mounting bracket and receiving said sliding mechanisms, wherein the cradle extends laterally between the pair of tracks and is configured to:
      move linearly along the tracks,
      rotate vertically between the tracks, and
      rotate axially between the pair of tracks to provide a three dimensional orientation of the cradle while supporting the computer tablet; wherein said sliding mechanisms are offset from one another while supporting the computer tablet.

10. The universal tablet cradle assembly of claim 9 wherein the cradle bottom edge is configured to rotate downwardly between the pair of tracks to a secured displayed position while the cradle is positioned in multiple locations along the tracks while supporting the computer tablet.

11. The universal tablet cradle assembly of claim 10 wherein the cradle bottom edge is configured to rotate downwardly between the pair of tracks to the secured displayed position when the cradle is positioned in all locations along the tracks while supporting the computer tablet.

12. The universal tablet cradle assembly of claim 9 wherein the pair of sliding mechanisms are configured to laterally move within the respective tracks, in a direction transverse to the tracks, to allow axial rotation of the cradle between the pair of tracks.

13. The universal tablet cradle assembly of claim 12 wherein the sliding mechanisms comprise a roller disposed about a fastener, wherein the roller can move linearly along the fastener and inside the track to allow the cradle to axially rotate between the pair of tracks.

14. The universal tablet cradle assembly of claim 9 wherein the mounting bracket is configured to be fixedly mounted under the horizontal surface, such that there is no spacing between the mounting bracket and the horizontal surface.

15. The universal tablet cradle assembly of claim 9 wherein a pair of latches is disposed along said lip, the pair of latches configured to secure the cradle toward the mounting bracket while storing the computer tablet.

16. The universal tablet cradle assembly of claim 9 further comprising a friction stopper at the top edge of said cradle, the friction stopper configured to secure the cradle in the displayed position while supporting the computer tablet.

* * * * *